(12) United States Patent
Lewis

(10) Patent No.: US 10,118,729 B2
(45) Date of Patent: Nov. 6, 2018

(54) DECORATED BEVERAGE CAN TABS

(71) Applicant: Rexam Beverage Can Company, Chicago, IL (US)

(72) Inventor: Jeffrey L. Lewis, Trussville, AL (US)

(73) Assignee: REXAM BEVERAGE CAN COMPANY, Chicago, IL (US)

( * ) Notice: Subject to any disclaimer, the term of this patent is extended or adjusted under 35 U.S.C. 154(b) by 37 days.

(21) Appl. No.: 14/941,750

(22) Filed: Nov. 16, 2015

(65) Prior Publication Data
US 2016/0137341 A1 May 19, 2016

Related U.S. Application Data

(62) Division of application No. 13/506,436, filed on Apr. 17, 2012, now Pat. No. 9,186,924.

(51) Int. Cl.
| | | |
|---|---|---|
| *G09F 3/00* | (2006.01) | |
| *B65D 17/00* | (2006.01) | |
| *B41M 5/24* | (2006.01) | |
| *B23K 26/364* | (2014.01) | |
| *B44C 1/22* | (2006.01) | |
| *B65D 17/28* | (2006.01) | |

(52) U.S. Cl.
CPC .......... *B65D 17/165* (2013.01); *B23K 26/364* (2015.10); *B41M 5/24* (2013.01); *B44C 1/228* (2013.01); *B65D 17/4012* (2018.01); *B65D 2517/0014* (2013.01); *B65D 2517/0053* (2013.01); *B65D 2517/0092* (2013.01)

(58) Field of Classification Search
CPC ................ G09F 23/0091; B65D 17/00; B65D 2517/0014; B65D 2517/0053
USPC .......................................................... 40/306
See application file for complete search history.

(56) References Cited

U.S. PATENT DOCUMENTS

| | | |
|---|---|---|
| 1,257,710 A | 2/1918 | Januchowsky |
| 1,878,541 A | 9/1932 | Reinhold |
| | (Continued) | |

FOREIGN PATENT DOCUMENTS

| | | |
|---|---|---|
| AU | 81794/94 A | 9/1995 |
| BE | 1014393 A3 | 10/2003 |
| | (Continued) | |

OTHER PUBLICATIONS

Rexam Beverage Can Company, International Search Report from pending Application No. PCT/US2013/036990 dated Sep. 3, 2013 from the European Patent Office acting as the International Searching Authority.

(Continued)

*Primary Examiner* — Joanne Silbermann
(74) *Attorney, Agent, or Firm* — Greer, Burns & Crain, Ltd.

(57) ABSTRACT

A decorated tab for a beverage container has a lift end, a nose end, and central webbing. An enclosed portion of the central webbing has a coating. A symbol is located on the enclosed region which is created by selective removal of the coating by a laser ablation. The symbol has a boundary profile defining a perimeter of the symbol generated by a continuous, uninterrupted vectorized laser dot pattern defining regions of ablated coating. The symbol has an interior portion generated by a plurality of pulsed rasterized laser dots defining further regions of ablated coating.

11 Claims, 15 Drawing Sheets

(56) References Cited

U.S. PATENT DOCUMENTS

| | | |
|---|---|---|
| 2,866,338 A | 12/1958 | Muncheryan |
| D212,462 S | 10/1968 | Peters et al. |
| D215,415 S | 9/1969 | Peters et al. |
| 3,559,842 A | 2/1971 | Rich |
| D221,736 S | 9/1971 | Jacobs et al. |
| D224,964 S | 10/1972 | Saunders |
| D226,072 S | 1/1973 | Saunders |
| D228,344 S | 9/1973 | Markert |
| 3,822,496 A | 7/1974 | Minder |
| 4,083,471 A | 4/1978 | Frank |
| 4,203,240 A | 5/1980 | Goodwin |
| 4,232,797 A | 11/1980 | Waterbury |
| 4,322,016 A | 3/1982 | Barrash |
| 4,380,129 A | 4/1983 | Barrash |
| 4,459,910 A | 7/1984 | Taube |
| 4,557,505 A | 12/1985 | Shaefer et al. |
| D289,017 S | 3/1987 | Spangler et al. |
| 4,880,137 A | 11/1989 | Wells |
| 5,191,695 A | 3/1993 | Pavely et al. |
| 5,215,864 A | 6/1993 | Laakmann |
| D338,413 S | 8/1993 | Ciambella |
| 5,316,166 A | 5/1994 | Pavely et al. |
| 5,359,766 A | 11/1994 | Pavely et al. |
| D365,021 S | 12/1995 | Park |
| 5,655,678 A | 8/1997 | Kobayashi |
| 5,720,555 A | 2/1998 | Elele |
| 5,741,105 A | 4/1998 | Schubert et al. |
| 5,799,815 A | 9/1998 | Lang |
| 5,855,969 A | 1/1999 | Robertson |
| 5,928,126 A | 7/1999 | Guillot |
| 5,959,768 A | 9/1999 | Hutton |
| 5,967,726 A | 10/1999 | Turner et al. |
| 5,996,832 A | 12/1999 | Nieuwoudt |
| 5,997,849 A | 12/1999 | Small et al. |
| D422,211 S | 4/2000 | Sedgeley |
| D423,932 S | 5/2000 | Miura |
| 6,080,958 A | 6/2000 | Miller et al. |
| 6,105,806 A | 8/2000 | Stasiuk |
| 6,139,779 A | 10/2000 | Small et al. |
| 6,161,717 A | 12/2000 | Forrest et al. |
| 6,202,880 B1 | 3/2001 | Strube et al. |
| 6,433,302 B1 | 8/2002 | Miller et al. |
| 6,476,349 B1 | 11/2002 | Jendick |
| 6,479,787 B1 | 11/2002 | Jendick |
| 6,485,824 B2 | 11/2002 | Senga et al. |
| 6,498,318 B1 | 12/2002 | Miller et al. |
| 6,501,046 B1 | 12/2002 | Miller et al. |
| 6,579,006 B1 | 6/2003 | Pariseau |
| 6,590,183 B1 | 7/2003 | Yeo |
| 6,634,516 B2 | 10/2003 | Carballido |
| 6,706,995 B2 | 3/2004 | Miller et al. |
| 6,772,900 B2 | 8/2004 | Turner et al. |
| 6,777,098 B2 | 8/2004 | Yeo |
| 6,808,351 B1 | 10/2004 | Brown et al. |
| 6,854,947 B2 | 2/2005 | Lee |
| 6,868,627 B2 | 3/2005 | Elias |
| 6,872,913 B1 | 3/2005 | Jendick |
| 6,926,487 B1 | 8/2005 | Jendick |
| 6,929,136 B2 | 8/2005 | Salazar-Leal |
| 6,951,293 B2 | 10/2005 | Thibaut |
| D530,604 S | 10/2006 | Huckel |
| D531,899 S | 11/2006 | Huckel |
| D533,775 S | 12/2006 | Huckel |
| 7,537,129 B2 | 5/2009 | Bayss et al. |
| 7,594,584 B2 | 9/2009 | Durdon et al. |
| 2003/0127415 A1 | 7/2003 | Carballido |
| 2003/0178397 A1 | 9/2003 | Jendick |
| 2005/0045637 A1 | 3/2005 | Rohr et al. |
| 2005/0258175 A1 | 11/2005 | Robertson |
| 2006/0140746 A1 | 6/2006 | Koon |
| 2006/0151501 A1 | 7/2006 | Chang et al. |
| 2009/0041083 A1 | 2/2009 | McParland |
| 2009/0266804 A1 | 10/2009 | Costin et al. |
| 2009/0284732 A1 | 11/2009 | Vitale |
| 2010/0078010 A1 | 4/2010 | Kolb |
| 2010/0183822 A1 | 7/2010 | Ruggie et al. |
| 2010/0193519 A1 | 8/2010 | Forrest et al. |
| 2011/0084051 A1 | 4/2011 | Reed et al. |
| 2011/0226636 A1 | 9/2011 | Petti |

FOREIGN PATENT DOCUMENTS

| | | |
|---|---|---|
| DE | 19701547 A1 | 3/1998 |
| EP | 0923457 B1 | 6/1999 |
| EP | 0993964 A2 | 4/2000 |
| EP | 1123772 A1 | 8/2001 |
| EP | 1218248 B1 | 7/2002 |
| EP | 1663794 B1 | 1/2007 |
| FR | 2649628 A3 | 1/1991 |
| GB | 2105257 A | 3/1983 |
| GB | 2185613 A | 7/1987 |
| GB | 2320008 A | 6/1998 |
| WO | 98/10945 A1 | 3/1998 |
| WO | 99/09853 A2 | 3/1999 |
| WO | 99/58407 A1 | 11/1999 |
| WO | 00/03832 A1 | 1/2000 |
| WO | 00/47487 A1 | 8/2000 |
| WO | 01/51295 A1 | 7/2001 |
| WO | 01/68460 A2 | 9/2001 |
| WO | 2002028730 A1 | 4/2002 |
| WO | 2002076759 A1 | 10/2002 |
| WO | WO-2004015487 A1 * | 2/2004 ......... G02F 1/133504 |
| WO | 05/021392 A1 | 3/2005 |
| WO | 2007007102 A2 | 1/2007 |
| WO | 2007021294 A1 | 2/2007 |

OTHER PUBLICATIONS

Turner, Timothy L., et al., "Promotional Tabs for Container Ends," non-published U.S. Appl. No. 09/156,563 deposited Sep. 17, 1998.

* cited by examiner

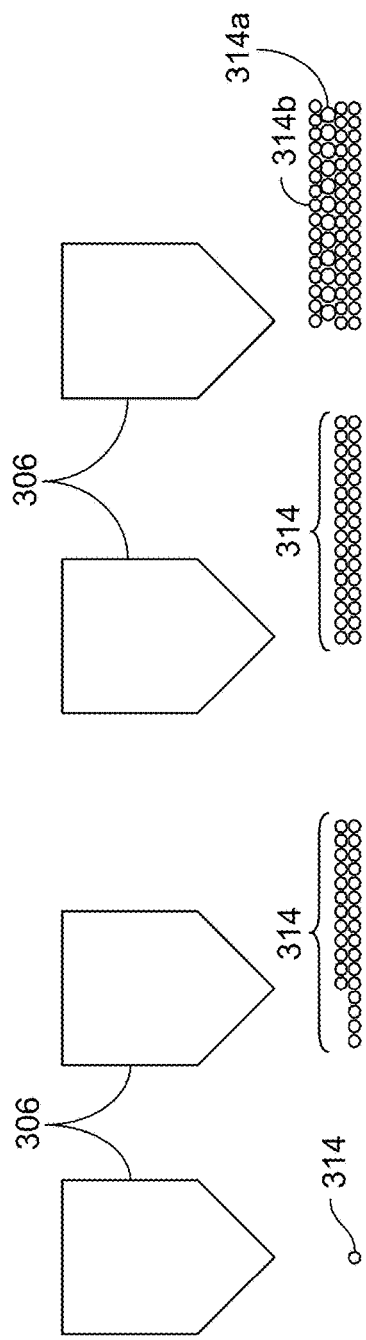
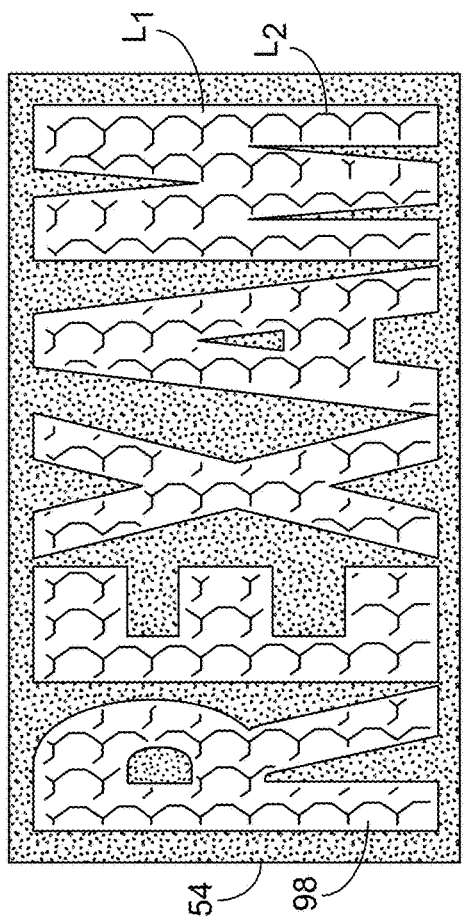
FIG. 4
FIG. 5

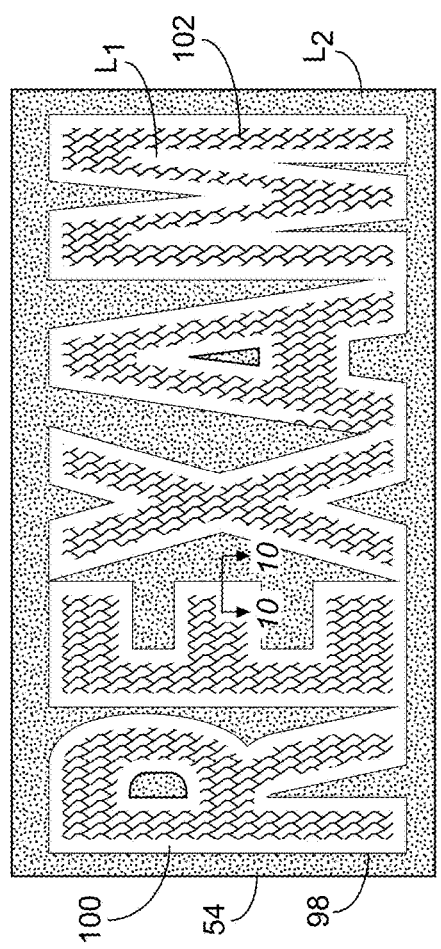
FIG. 8
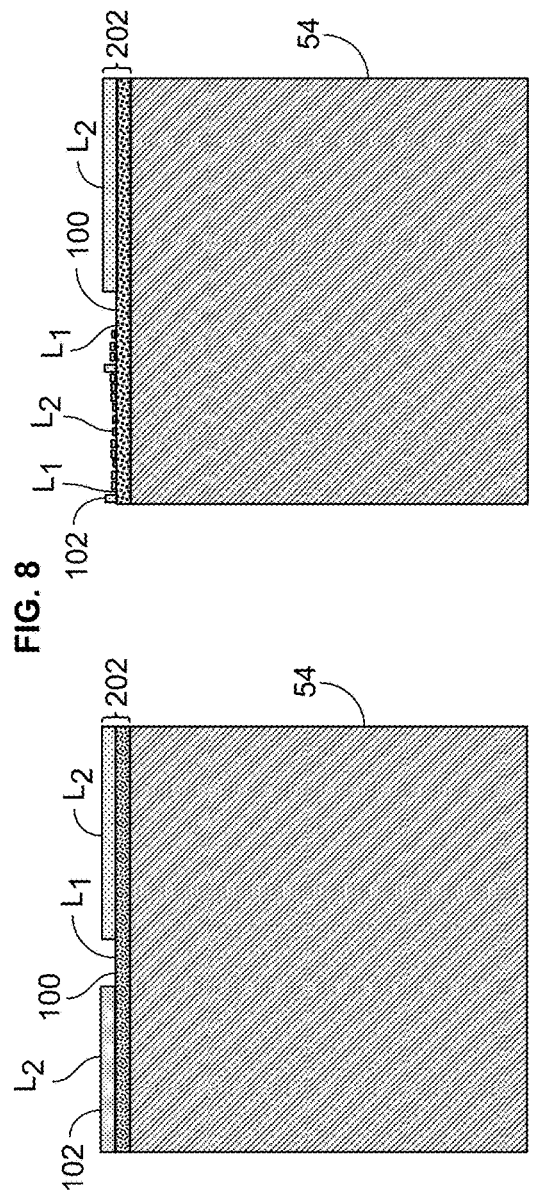
FIG. 9
FIG. 10

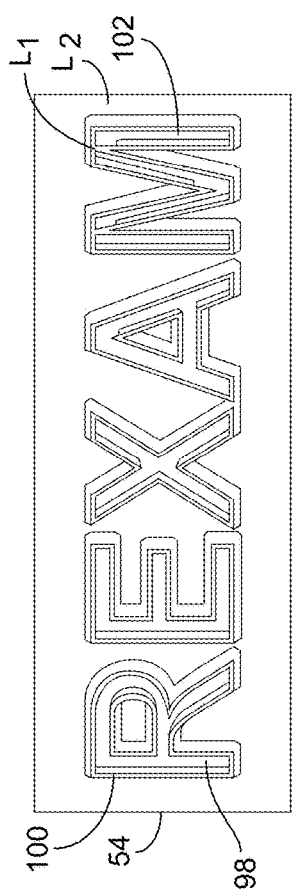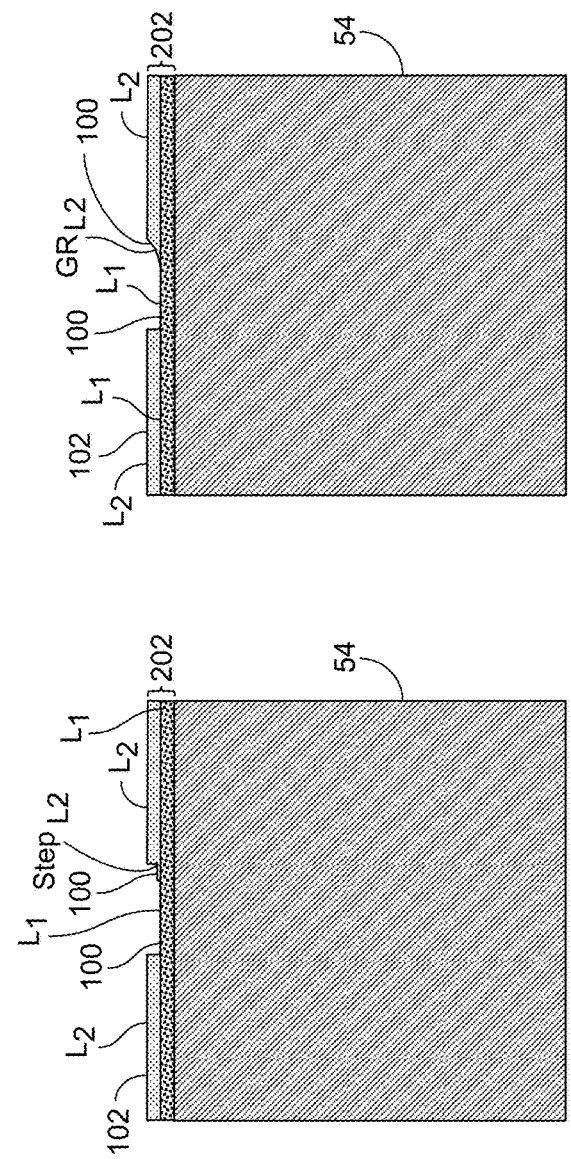

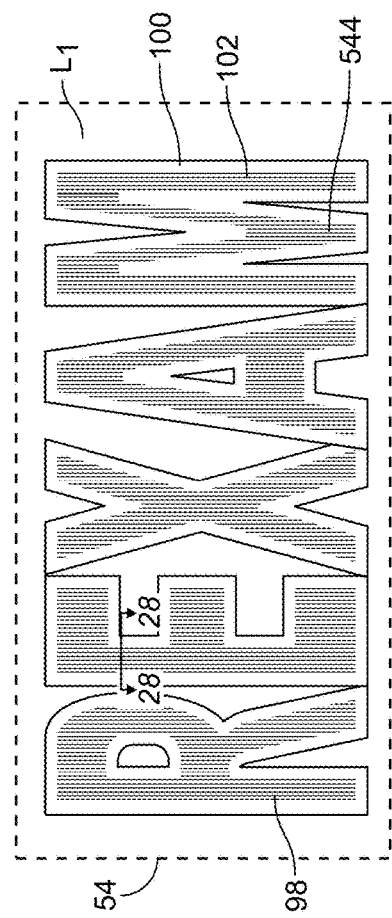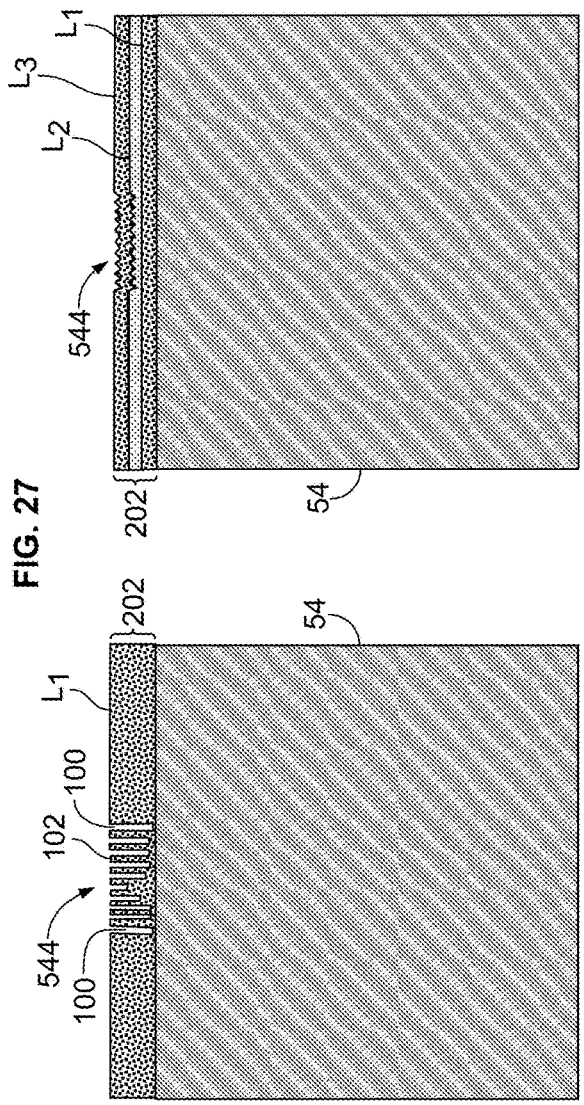

DECORATED BEVERAGE CAN TABS

CROSS-REFERENCE TO RELATED APPLICATIONS

This Application is a divisional of co-pending U.S. application Ser. No. 13/506,436 filed on Apr. 17, 2012. The Applications are commonly assigned and incorporated by reference herein.

TECHNICAL FIELD

The invention relates to beverage can tabs for severing a frangible score on a beverage can lid. More particularly, the invention relates to decorating beverage can tabs by selective removal of a coating on the beverage can tab through laser ablation.

BACKGROUND OF THE INVENTION

Typical end closures for beer and beverage containers have an opening panel and an attached leverage tab for pushing the opening panel into the container to open the end. The container is typically a drawn and ironed metal can, usually constructed from a thin plate of aluminum or steel. End closures for such containers are also typically constructed from a cutedge of thin plate of aluminum, formed into a blank end, and manufactured into a finished end by a process often referred to as end conversion. These ends are formed in the process of first forming a cutedge of thin metal, forming a blank end from the cutedge, and converting the blank into an end closure which may be seamed onto a container.

These types of container ends have been used for many years, with almost all such ends in use today being the "ecology" or "stay-on-tab" ("SOT") ends in which the tab remains attached to the end after a tear panel, including large-opening ends ("LOE"), is opened. The tear panel being a portion of the can end defined by a score length. The tear panel may be opened, that is the score may be severed, and the tear panel displaced at an angular orientation relative to the remaining portion of the can end. The tear panel remains hingeably connected to the remaining portion of the can end by a hinge segment, leaving an opening through which the user draws the contents of the container. In an LOE, the opening is at least 0.5 square inches in area.

Opening of the tear panel is operated by the tab which is attached to the can end by a rivet. The tab is attached to the can end such that a nose of the tab extends over a proximal portion of the tear panel. A lift end of the tab is located opposite the tab nose and provides access for a user to lift the lift end, such as with the user's finger, to force the nose against the proximal portion of the tear panel.

When the tab nose is forced against the tear panel, the score initially ruptures at a vent region of the score. This initial rupture of the score is primarily caused by the lifting force on the tab resulting in lifting of a central region of the can end, immediately adjacent the rivet. As the tab is lifted further, the score rupture propagates along the length of the score, eventually stopping at the hinge segment.

Tabs are often also used to convey information to users. This information may be in the form of promotional materials, logos, or the like. Methods such as printing, incising, laser ablation, stamping, etc. have been employed to provide information on the tabs. To date, none of these methods has been widely accepted.

However, laser marking to selectively remove coatings on the tab is becoming increasingly popular. This type of laser marking is particularly popular in branding or creating brand awareness. Here, a beverage company's trademark is laser marked on an enclosed portion of a central webbing of the tab, typically by selectively removing an epoxy coating on the tab.

One problem to overcome in successfully implementing a laser marking system of this type is the very small amount of time, called a dwell time, allowed for the marking. Dwell times are generally less than 100 milliseconds, typically less than 50 milliseconds, and more specifically about 40 milliseconds. The logo, trademark, or symbol must be marked by the laser on the tab during the dwell time and not exceed the dwell time. To produce the symbol within the dwell time, manufacturers use a raster technique with their laser equipment. This presents a second problem, namely resolution or quality of the resulting image.

It is important to any trademark owner that its mark be used properly and reproduced faithfully. Companies expend vast resources on branding and proper trademark usage. Quality variables such as location, resolution, contrast, etc. are closely monitored and adherence to the trademark owners' quality standards is of the utmost importance.

Often times, the trademark usage standards conflict with the necessity to reproduce the trademark during the dwell time.

Many publications are devoted to reproducing symbols and the like on beverage containers. These include: U.S. Patent Application Publication No. 2011/0084051, U.S. Pat. No. 6,080,958, U.S. Pat. No. 6,706,995, U.S. Pat. No. 6,433,302, U.S. Pat. No. 6,498,318, U.S. Pat. No. 6,501,046, U.S. Patent Application Publication No. 2005/0045637, U.S. Pat. No. 6,808,351, U.S. Patent Application Publication No. 2003/0178397, U.S. Pat. No. 6,476,349, U.S. Pat. No. 6,479,787, U.S. Patent Application Publication No. 2006/0151501, U.S. Patent Application Publication No. 2010/0193519, U.S. Pat. No. 6,926,487, U.S. Pat. No. 5,855,969, U.S. Patent Application Publication No. 2011/0226636, U.S. Pat. No. 6,872,913, International Publication No. WO 98/10945, International Publication No. WO 01/51295, International Publication No. WO 2007/007102, and European Patent Publication No. EP 1218248. Commonly assigned U.S. Pat. Nos. 8,146,768 and 8,844,747 and International Patent Application No. PCT/US2011/027942 describe methods of decorating and/or strengthening can end tabs. None of these references adequately addresses the problems set forth above.

Accordingly, the present invention is provided to solve the problems discussed above and other problems, and to provide advantages and aspects not provided by prior laser etched tabs of this type. A full discussion of the features and advantages of the present invention is deferred to the following detailed description, which proceeds with reference to the accompanying drawings.

SUMMARY OF THE INVENTION

One aspect of the present invention is directed to a decorated tab for a beverage container. The tab comprises a lift end, a nose end for contacting a tear panel on a beverage can lid opposite the lift end, central webbing between the lift end and the nose end comprising an enclosed region, a coating on the central webbing, and a symbol on the enclosed region created by selective removal of the coating by a laser ablation. The symbol comprises a boundary profile defining a perimeter of the symbol comprising a continuous, uninterrupted vectorized laser dot pattern defining regions of ablated coating and an interior portion comprising a plurality of pulsed rasterized laser dots defining further regions of ablated coating.

The decorated tab of this aspect of the invention may include one or more of the following features, alone or in any reasonable combination. The plurality of pulsed rasterized dots of the interior portion may comprise a first pulsed dot having an area greater than a second pulsed dot of the vectorized laser dot pattern of the boundary profile. The tab may further comprise a rivet island, a void region partially surrounding the rivet island, the void region defined by a void region perimeter of the central webbing, a rivet hole in the rivet island, and/or a hinge region extending between opposing end portions of the void region. The laser ablation is within a dwell period. A first layer of the coating may be completely removed from the interior of the symbol.

Another aspect of the present invention is directed to a method for decorating a tab for a beverage container wherein the tab comprises a lift end separated from a nose end by a central webbing, the method comprising the steps of: providing a source of a laser beam; generating a laser beam from the source; focusing the laser beam an object distance from the source; creating an ablation cycle for ablating a surface of the tab to form a symbol; adjusting a size of the laser beam as measured at the object distance; and varying the size of the laser beam during the ablation cycle.

Another aspect of the present invention is directed to a method for decorating a tab for a beverage container wherein the tab comprises a lift end separated from a nose end by a central webbing, the method comprising the steps of: providing a source of a laser beam; generating a laser beam from the source; focusing the laser beam an object distance from the source; creating an ablation cycle for ablating a surface of the tab to form a symbol; and creating a non-linear laser beam path during the ablation cycle.

Another aspect of the present invention is directed to a method for decorating a tab for a beverage container comprising the steps of: providing a source of a laser beam; providing a tab stock of an aluminum alloy coated with a first layer of an opaque colored epoxy; generating a laser beam; providing a vector data set corresponding to an outline of a predetermined symbol; providing a raster data set corresponding to an interior region of the predetermined symbol; directing the laser beam at the tab stock according to the vector data set to remove portions of the first layer to produce the outline of the predetermined symbol on the tab stock; and directing the laser beam at the tab stock according to the raster data set to remove portions of the first layer to produce the interior of the predetermined symbol on the tab stock.

Another aspect of the present invention is directed to a decorated tab. The decorated tab for a beverage container comprises a lift end, a nose end, a central webbing, and a symbol. The nose end is for contacting a tear panel on a beverage can lid opposite the lift end. The central webbing is located between the lift end and the nose end. The coating is located on the central webbing. The symbol is located on the central webbing and comprises a light diffraction feature produced from a micro slit pattern in the coating.

This aspect of the present invention may include one or more of the following features, alone or in any reasonable combination. The micro slit pattern may comprise a slit in the coating having a width less than 1000 nm. The micro slit pattern may comprise a slit in the coating having a depth less than 1000 nm. The micro slit pattern may comprise a plurality of slits formed in the coating having a depth less than 1000 nm. The light diffraction feature may be created by selective removal of the coating by a laser ablation. The light diffraction feature may be created by embossing the coating to produce the micro slit pattern. The symbol may be created in under 50 milliseconds. The central webbing may comprise an enclosed region wherein the light diffraction feature is formed thereon.

Another aspect of the present invention is directed to a method of decorating a tab. The method comprises the steps of: providing a source of a laser beam; providing a tab for a beverage container; emitting a laser beam from the source; and treating the coating with the laser beam to form a light diffraction feature on the tab within a dwell time of 50 milliseconds.

This aspect may include one or more of the following features, alone or in any reasonable combination. The method may further comprise the step of forming a micro slit pattern in the coating comprising a slit having a width of less than 1000 nm. The method may further comprise the step of forming a micro slit pattern in the coating comprising a slit having a depth of less than 1000 nm. The method may further comprise the step of forming a symbol in the coating wherein the light diffraction feature forms at least a part of the symbol.

Another aspect of the present invention is directed to a decorated tab. The tab comprises a lift end, a nose end, a central webbing, a coating and a symbol. The nose end is for contacting a tear panel on a beverage can lid opposite the lift end. The central webbing is located between the lift end and the nose end comprises an enclosed region. The coating is located on the central webbing. The symbol is located on the enclosed region and is created by selective removal of the coating by a laser ablation. The symbol comprises a first boundary profile defining a perimeter of the symbol created by a vectorized laser dot pattern defining regions of ablated coating and an interior portion comprising a light diffraction feature created by a micro slit pattern in the coating imperceptible to the naked human eye.

Another aspect of the present invention is directed to a decorated tab. The tab comprises a lift end, a nose end, a central webbing, a coating and a light diffraction feature. The nose end is for contacting a tear panel on a beverage can lid opposite the lift end. The central webbing is located between the lift end and the nose end. The coating is located on the central webbing. The light diffraction feature is formed on the central webbing and is created from a micro slit pattern in the coating wherein the micro slit pattern is imperceptible to the naked human eye.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4 is a schematic diagram representing a raster-type laser marking cycle;

FIG. 5 is a magnified partial top view of a grab portion of a tab decorated according to a prior art method;

FIG. 8 is a magnified partial top view of a grab portion of a tab decorated according to one aspect of the present invention, i.e. rasterized data used to ablate the fill area of the symbol illustrated in FIG. 7;

FIG. 9 is a schematic representation of a cross-section taken along 9-9 of FIG. 7 showing a laser removal of a layer of coating to produce the symbol illustrated in FIG. 7;

FIG. 10 is a schematic representation of a cross-section taken along 10-10 of FIG. 8 showing a laser removal of a layer of coating to produce the symbol illustrated in FIG. 8;

FIG. 14 is a magnified partial top view of a grab portion of a tab decorated according to one aspect of the present invention, using a laser to produce shading by producing a step-wise or gradient-wise reduction of a plurality of layers of a coating to produce a symbol having three dimensional effects;

FIG. 15 is a schematic representation of a cross-section of a portion of FIG. 14 showing a laser removal of a plurality of layers of a coating to produce step-wise shading to create the symbol illustrated in FIG. 14;

FIG. 16 is a schematic representation of a cross-section of a portion of FIG. 14 showing a laser removal of a plurality of layers of a coating to produce gradient-wise shading to create the symbol illustrated in FIG. 14;

FIG. 27 is a magnified partial top view of a grab portion of a tab decorated according to one aspect of the present invention, using a laser treatment to ablate a vector pattern boundary portion of a symbol and a further laser treatment to provide a plurality of ablated slits in a predetermined pattern associated with a fill portion of the symbol producing a diffraction pattern for a fill portion, including but not limited to a holographic image on the grab portion;

FIG. 28 is a schematic representation of a cross-section of the grab portion of FIG. 27;

FIG. 29 is a schematic representation of a cross-section of a portion of a grab portion of a tab showing an alternative method of forming a holographic symbol;

DETAILED DESCRIPTION

Figure 1:
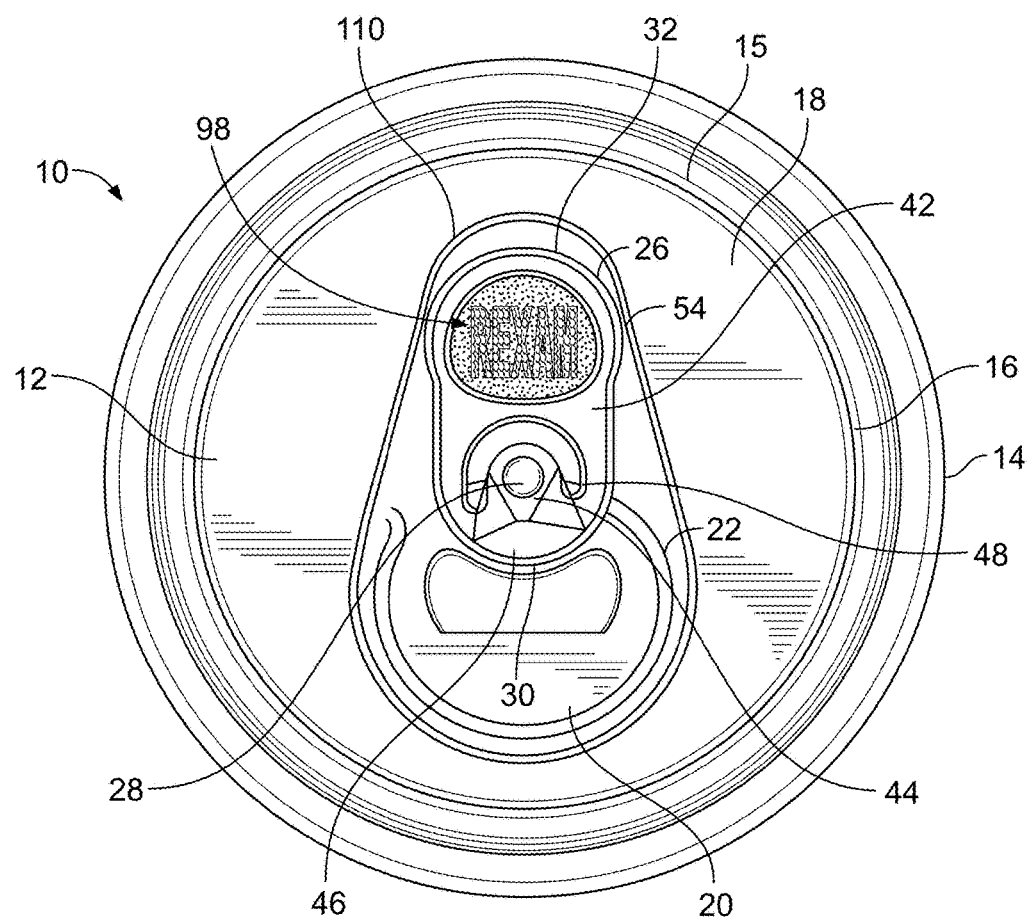
FIG. 1 is a top view of a beverage can and or lid including a stay-on tab decorated via laser removal of a coating according to aspects of the invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, the end closure 10 for a container (not shown) has a central panel wall 12 having a seaming curl 14 for joining the end closure 10 to the container. The container is typically a drawn and ironed metal can, usually constructed from a thin plate of aluminum or steel. End closures for such containers are also typically constructed from a cutedge of thin plate of aluminum or steel, formed into blank end, and manufactured into a finished end by a process often referred to as end conversion. In the embodiments shown in the figures, the central panel 12 is joined to a container by a seaming curl 14 which is joined to a mating curl of the container. The seaming curl 14 of the end closure 10 is integral with the central panel 12 by a downwardly extending wall 15 and a strengthening member 16, typically either a countersink or a fold, which is joined to the panel outer edge 18 of the central panel 12. This type of means for joining the central panel 12 to a container is presently the typical means for joining used in the industry, and the structure described above is formed in the process of forming the blank end from a cutedge of metal plate, prior to the end conversion process. However, other means for joining the central panel to a container may be employed with the present invention.

The steps of manufacturing the end 10 begin with blanking the cutedge, typically a round or non-round cutedge of thin metal plate. Examples of non-round cutedge blanks include elliptical cutedges, convoluted cut edges, and harmonic cut edges. A convoluted cutedge may be described as generally having three distinct diameters, each diameter being 45° relative to the others. The cutedge is then formed into a blank end by forming the seaming curl, countersink, panel radius and the central panel.

A means for opening the can end or accessing the contents of the container is typically formed in a conversion process for this type of end closure. This process includes the following steps: forming a rivet by first forming a projecting bubble in the center of the panel and subsequently working the metal of the bubble into a button and into the more narrow projection of metal being the rivet; forming the tear panel by scoring the metal of the panel wall; forming an inner bead or panel on the tear panel; forming a deboss panel by bending the metal of the panel wall such that a central area of the panel wall is slightly lower than the remaining panel wall; staking the tab to the rivet; and other subsequent operations such as wipe-down steps to remove sharp edges of the tab, lettering on the panel wall by scoring, incising, or embossing (or debossing), and restriking the rivet island.

The central panel wall 12 is generally centered about a longitudinal axis 50 and has a displaceable tear panel 20 defined by a frangible score 22 and a non-frangible hinge segment. The tear panel 20 of the central panel 12 may be opened, that is the frangible score 22 may be severed and the tear panel 20 displaced at an angular orientation relative to the remaining portion of the central panel 12, while the tear panel 20 remains hinged to the central panel 12 through the hinge segment. In this opening operation, the tear panel 20 is displaced at an angular deflection. More specifically, the tear panel 20 is deflected at an angle relative to the plane of the panel 12, with the vortex of the angular displacement being the hinge segment.

The tear panel 20 is formed during the conversion process by a scoring operation. The tools for scoring the tear panel 20 in the central panel 12 include an upper die on a public side having a scoring knife edge in the shape of the tear panel 20, and a lower die on a product side to support the metal in the regions being scored. When the upper and lower dies are brought together, the metal of the panel wall 12 is scored between the dies. This results in the scoring knife edge being embedded into the metal of the panel wall 12, forming the score which appears as a wedge-shaped recess in the metal. The metal remaining below the wedge-shaped recess is the residual of the score 22. Therefore, the score is formed by the scoring knife edge causing movement of metal, such that the imprint of the scoring knife edge is made in the public side of the panel wall 12.

The central panel 12 further includes a tab 26 recessed within a deboss panel 110. The tab 26 has a generally elongated body with a central axis defined by a central cross section through the tab nose 30, and through a central webbing 42 and the lift end 32. Typical prior art container ends often have a tab 26 which is staked in the final steps of the conversion process by staking the area of the panel wall 12 adjacent and under the rivet island 46 at an angle, to bias the tab 26 such that the lift end 32 of the tab 26 rests close to the panel wall 12. The central panel 12 may also have a recess near the lift end 32 of the tab 26 to allow for easier finger access.

The opening of the tear panel 20 is operated by the tab 26 which is attached to the central panel 12 by a rivet 28, generally through a rivet hole 29. The tab 26 is attached to the central panel 12 such that the nose 30 of the tab 26 extends over a proximal portion of the tear panel 20. The lift end 32 of the tab 26 is located opposite the tab nose 30 and provides access for a user to lift the lift end 32, such as with the user's finger, to force the nose 30 against the proximal portion of the tear panel 20.

When the tab nose 30 is forced against the tear panel 20, the score 22 initially ruptures at the vent region of the score 22 of the tear panel 20. This initial rupture of the score 22 is primarily caused by the lifting force on the tab resulting in lifting of a central region of the center panel, immediately adjacent the rivet 28, which causes separation of the residual metal of the score 22. The force required to rupture the score in the vent region, typically referred to as the "pop" force, is a lower degree of force relative to the force required to propagate other regions of the score 22 by continued lifting of the lift end 32 of the tab 26. Therefore, it is preferable for the panel 12 in the area around the rivet 28 only lifts enough to assist with initial score rupture, or "pop," and remains substantially stiff and flat to provide the needed leverage for the tab 26 to propagate the score line of the tear panel 20. The present invention provides such optimal stiffness in the center panel, as is explained further below.

After the initial "pop", or venting of the tear panel, the user continues to lift the lift end 32 of the tab 26 which causes the tab nose 30 to be pushed downward on the tear panel 20 to continue the rupture of the score 22, as an opening force. As the opening operation is continued, the tear panel 20 is displaced downward and is rotated about the hinge region to be deflected into the container.

The tab 26 has a central webbing 42 located between the nose 30 and the lift end 32. The central webbing 42 includes a hinge region 44 and a rivet island 46 surrounding the rivet 28. An opening or void region 48 of the tab webbing 42 provides an exposed area of the central panel 12. The void region 48 has a curvilinear geometry which borders the rivet island 46 and at least partially surrounds the rivet 28, with a first end of the void region 48 being disposed generally to one side of the rivet 28, and a second end being generally disposed on an opposite side of the rivet 28. The hinge region 44 of the tab webbing 42 includes a hinge line which is defined by a substantially straight line passing between the first end and the second end of the void region 48. It may also be necessary to add material to the tab webbing 42, modify the radius of the curl, add beading, or other strengthening means to ensure that this area is strong enough wherein the tab 26 bends at the hinge region 44 during opening.

The void region 48 is within the tab webbing 42. The void region 48 may have a generally arch-shaped configuration. In this configuration, the rivet island 46 again follows the general shape of the void region 48.

The figures represent only one example of the rivet island 46 configuration. However, those individuals who are ordinary skilled in the art would understand that the rivet island 46 and the void region 48 can take any number of shapes without departing from the spirit of the invention, including but not limited to all notch or lance type rivet islands.

The webbing 42 further comprises a grab portion 54. The grab portion 54 is adapted for user manipulation. Typically, the grab portion 54 includes a finger hole 55 or the like.

More recently, tabs have included fully closed grab portions onto which information or the like can be etched, stamped, or incised.

A tab of the present invention may include a grab portion 54 having an enclosed region defining a billboard surface 58. The billboard surface 58 is at least partially closed, and preferably fully closed. The billboard surface 58 has a top side and a bottom side. The bottom side is generally visible to the public while the bottom side is adjacent the center panel 12 in face-to-face relationship therewith.

The grab portion 54 of the tab 26 may be strengthened by displacing the material of the central webbing located in the billboard surface by forming or reforming emboss and deboss beads on the billboard surface 58.

The billboard surface 58 may also comprise information carrying indicia. The billboard surface 58 includes one or more indicia 98. Accordingly, the indicia 98 are created by removing a layer or a plurality of opaque color-carrying and clear layers, generally epoxy layers, via laser treatment, removal or ablation. The billboard surface 58 of the present invention carries indicia of remarkable resolution, generally greater than that achieved in the beverage container field. Resolution of such indicia 98 is typically limited by amount of time available to the manufacturer to mark or decorate the tabs. Referred to as a dwell time, this allotted amount of time is generally less than 100 milliseconds, typically less than 50 milliseconds and preferably about 40 milliseconds. The present invention provides indicia 98 of superb resolution within the dwell time and in a manufacturing setting and in at least one embodiment within about 40 milliseconds and in as little as 20 milliseconds.

Figure 2:
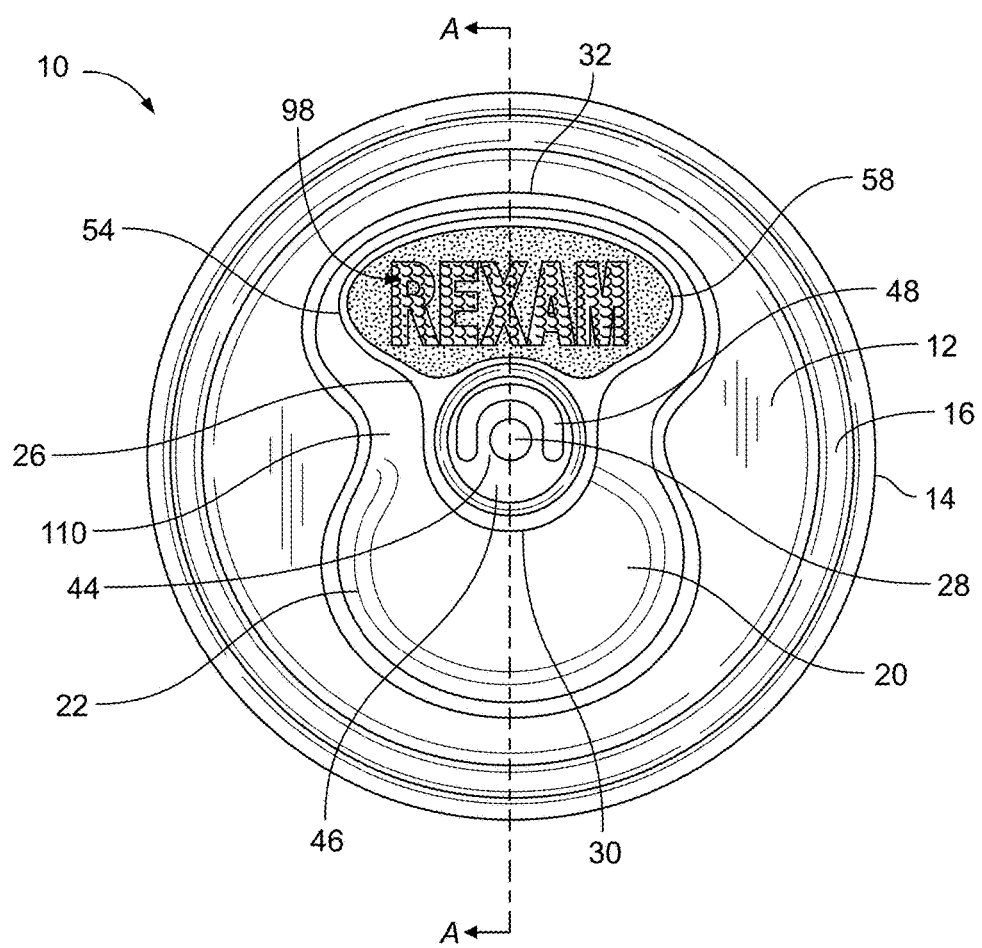
FIG. 2 is a top view of a beverage can and or lid including a stay-on tab having an enlarged billboard surface decorated via laser removal of a coating according to aspects of the invention.

As illustrated in FIG. 2, the grab portion 54 and the billboard surface 58 may be relatively large in comparison to other portions of the tab 26. For instance, the grab portion 54 is symmetrical about a center axis A-A and may have a width measured between the widest segments of the grab portion 54 which is at least 50% wider than a width of the tab 26 as measured through a parallel segment intersecting the rivet hole 29, preferably 10% to 100% wider, more preferably 25% to 100% wider, and most preferably 50% to 100% wider, or any range or combination of ranges therein. This creates an enlarged billboard surface 58 having a similar size ratio which lends itself to the information carrying or displaying indicium or indicia, which again may also serve as stiffening beads of reformed metal. The grab portion 54 and the billboard surface 58 preferably have a fan-shaped appearance, wider at the lift end 32 of the tab 26 and tapering inwardly towards the rivet. This fan-shape also lends itself to an arcuate lift end 32 of the tab 26.

Figure 3:
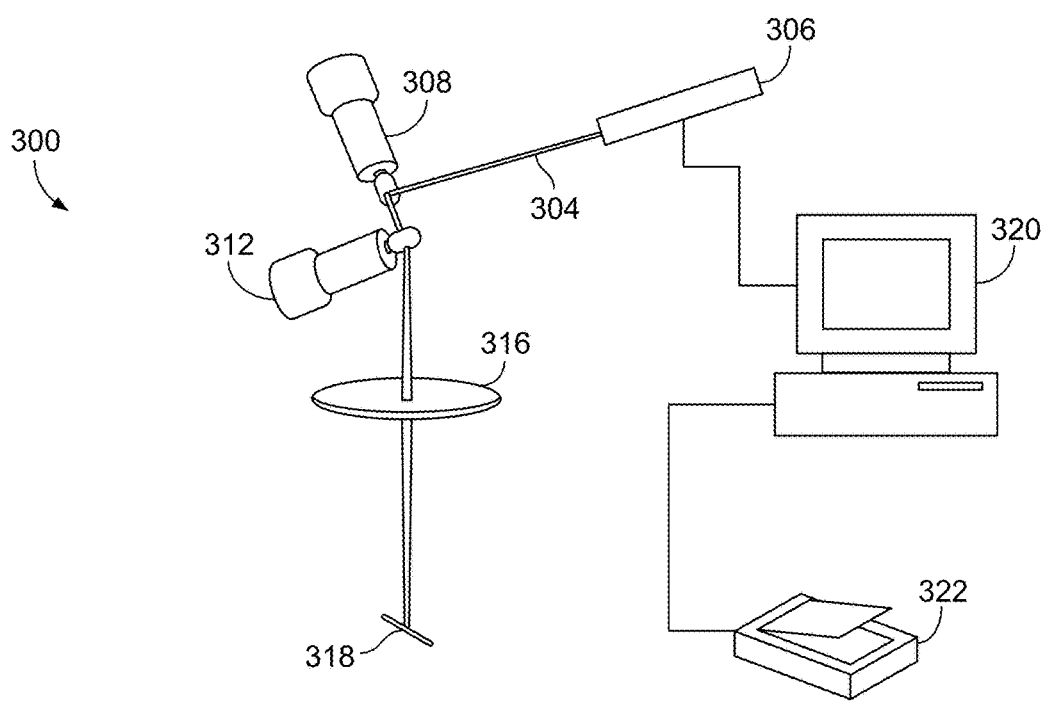
FIG. 3 is a schematic example of a laser marking apparatus.

Referring to FIG. 3, historically, laser marking of tabs was typically accomplished with a laser beam deflected marking apparatus 300. By scanning a laser beam 304 outputted from a source 306 with a movable X-axis galvanometer (mirror) 308 and a movable Y-axis galvanometer 312 (also a mirror), a pulsing effect creates dots 314 (see FIG. 4) which can be readily manipulated to quickly write letters, symbols, bar codes, and other graphics, using a raster scan. A lens 316 was used to focus the laser beam on a workpiece, such as the tab. The movement of the laser beam 304 across the workpiece is controlled by movement of the mirrors 308, 312 which are controlled by a controller, generally a computer.

There are generally three methods of laser marking—vector, raster, and masking. Masking is seldom if ever used in the beverage tab decorating field. Raster is primarily used because it is fast and works well when indicia include "fill" areas, as most do. Thus, the raster method has been preferred because it can be used to form the indicia during the dwell time and because the raster method works well when the indicia must be "filled", i.e. the coating at the interior of the symbol must be marked or ablated.

In a raster method, as illustrated in FIG. 4, a laser beam moves across a surface of an article in a back-and-forth, slowly-advancing linear pattern that will remind one of the printhead on an inkjet or similar printer. The pattern is usually optimized by a controller/computer so that areas to either side of the pattern which are not to be marked are ignored, and the trace across the material is thus shortened for better efficiency. The amount of advance of each line is normally less than an actual area of a dot 314 of the pulsing laser beam 304; the marked lines overlap just slightly to create a continuity of engravure. Thus, using the raster method a plurality of pulsed rasterized laser dots 314 defining regions of ablated material.

The advantage of rasterizing is the "fill" it produces. Most images to be engraved are bold letters or have large continuously-engraved areas, and these are formed well using the raster technique. It is in the "fill" area that the raster method can form a symbol within the dwell time.

However, curves and diagonals can sometimes suffer if the length or position of the raster lines varies even slightly in relation to the adjacent raster scan. Thus, resolution, repeatability and consistency can be a problem as the indicia will appear pixilated or rough along the edge or border of the indicia and artifacts of unremoved portion of layers can be left in the symbol. The raster method also produces a significant amount of wasted motion by the laser, as the laser is pulses on and off as it traverses in a straight line across an X-Y plane to produce a symbol. The area of the traverse can be minimized, but some wasted motion will typically occur in raster mode. This adversely affects the ability of the source of the laser to produce a symbol of high resolution within the manufacturing dwell time.

Additionally, rastered graphics are resolution dependent so they cannot scale up to an arbitrary resolution without the possibility of losing image quality. Raster images can be anything that you can see with your eye but are generally photographs or photo-realistic images. In some cases it is possible to convert raster images to vector images with a process called raster to vector conversion. With this method, many raster based images can converted to vector format and allow a vector/laser path to be applied to it so that a laser system can cut the material as opposed to engrave it.

Figure 6:
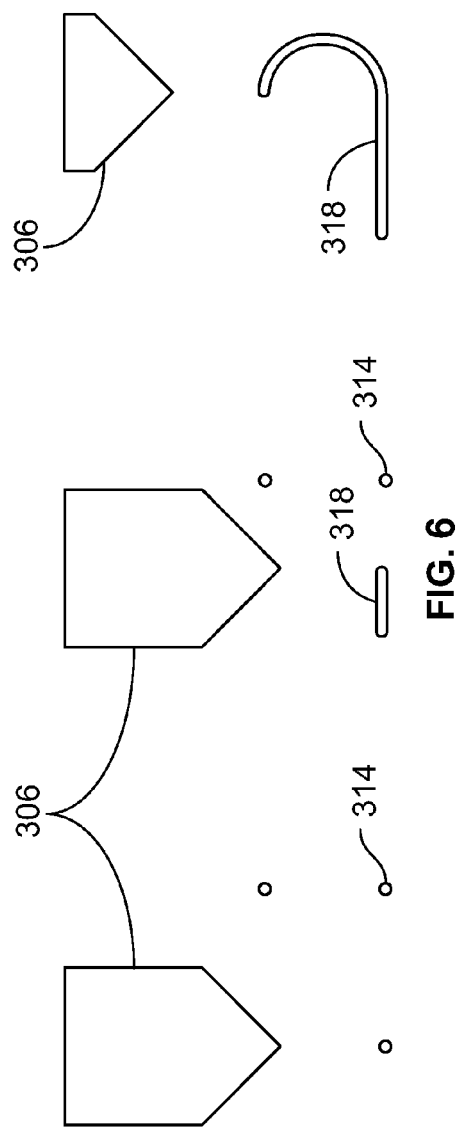
FIG. 6 is a schematic diagram representing a vector-type ablation marking cycle.

A representation of a symbol 98 produced by a raster technique is shown in FIG. 6. The symbol 98 in FIG. 5 exhibits poor resolution, including the pixilation, artifacts of layers, and rough edges discussed above. The area of the dot 314 may be increased to improve removal of the fill area of a symbol; however, increasing the area of the dot 314 will generally degrade the resolution and/or appearance of the outer profile, boundary, or outline of the symbol.

As shown in FIG. 6, vector marking follows the line and curve of the indicia to be marked, much like a pen-based plotter draws by constructing line segments from a description of the outlines of a pattern. It is called a vectored graphic because it is comprised of paths (or vectors) and points that connect the different paths. A laser path or pattern for a vectored graphic has a preprogrammed start point and follows a preprogrammed point-to-point path to a defined end point. In this way, an ablated path of a continuous, uninterrupted vectorized laser dot pattern 318 can be formed, substantially as illustrated. Vector drawings are represented by the computer as mathematical descriptions. Examples of vector data are arcs, lines, polylines, and curves. In vector mode, the laser traces the path of the drawing which allows for marking. Vector data has the advantage that it can be scaled to any resolution without loss of definition. Pen plotters also work in vector mode.

Figure 7:
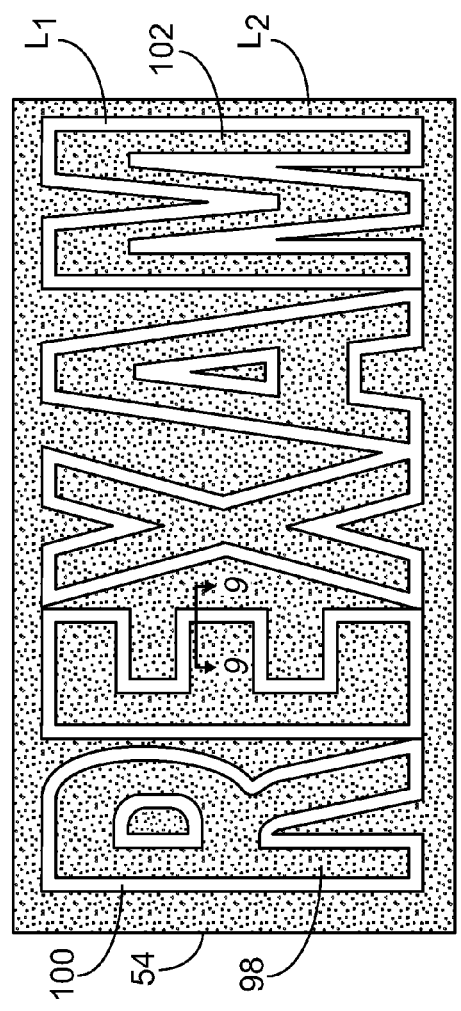
FIG. 7 is a magnified partial top view of a grab portion of a tab decorated according to one aspect of the present invention, i.e. vectorized data used to ablate a layer of a coating from the tab.

Vector mode works excellently for creating unfilled, complex indicia. There is very little wasted motion in vector mode because the laser works continuously. Therefore, in vector mode, the laser marking is efficient from a dwell time point of view. FIG. 7 represents a symbol 98 created using the vector mode.

Unfortunately, "fill" areas are not formed as readily as in the raster method. When attempting to form a "fill area in vector mode, the dwell time can be exceeded, overlap between laser paths can occur, resulting in over-exposure and undesired over-marking of areas within the symbol.

A single laser marking apparatus, such as the one shown schematically, in FIG. 3, is generally capable of performing vector scans and raster scans to ablate coatings from a workpiece. These laser marking apparatuses generally include or are equipped with a computer 320 having a memory for storing software and image files. The computer 320 may include a scanner 322, a software module, or hardware for receiving scanned images and outputting a laser beam to mark a workpiece according to a desired image. The apparatus may further include a software module or hardware for receiving, inputting or translating data to output a vector scan of an image.

Referring primarily to FIGS. 8-10, in one embodiment, a decorated tab 26 includes a symbol or indicium 98 on an enclosed region or grab portion 54. The tab 26 includes a coating 202 on the central webbing 42 and at least on the grab portion 54. The coating 202 includes a plurality of layers, preferably a first layer $L_1$ and a second layer $L_2$. The first layer $L_1$ is adjacent the bare metal of the tab stock and is generally a clear or translucent layer. The second layer $L_2$ is located on an upper surface of the first layer $L_1$ and is generally an opaque or color-carrying layer. The symbol 98 is created by selective removal of the coating 202 by a laser ablation wherein the laser ablation comprises a plurality of pulsed dots generated by a pulsing laser beam. The symbol 98 includes a boundary profile 100 defining a perimeter of the symbol 98 and an interior portion 102. The boundary profile 100 includes a continuous, uninterrupted vectorized laser dot pattern 318 defining regions of ablated coating. The interior portion 102 comprises a plurality of pulsed rasterized laser dots 314 defining further regions of ablated coating.

One manner in which the symbol 98 can be generated with great uniformity and high resolution within the dwell time runs counter to the generally accepted teachings in the art. Namely, the area of the laser dots of the present invention are varied. Typically, smaller rasterized dots were preferred in order to generate a cleaner, less pixilated boundary profile 100. In the present invention, the continuous, uninterrupted vectorized laser dot pattern 318 of the boundary profile is generally created by a laser dot having a smaller area relative to the largest pulsed laser dot of the rasterized fill of the symbol 98. The rasterized portion of the symbol 98, i.e. the fill portion, comprises a plurality of pulsed laser dots 314 wherein the plurality of pulsed dots 314 comprise a first pulsed dot 314a having an area greater than a second pulsed dot 314b. This technique allows complex symbols 98 having remarkable resolution to be generated within the manufacturing dwell time.

The symbol 98 of this embodiment is generally created by performing a vectorized scan to form the boundary profile. This is illustrated in FIGS. 7 and 9. The laser beam ablates a second layer $L_2$ of the coating 202 to a depth within the bounds of a first layer $L_1$. Subsequently, a raster scan cleans the interior of the symbol to create the fill portion of the symbol 98. This is illustrated in FIGS. 8 and 10. Some artifacts of the second layer $L_2$ are typically left in the fill area due to the limits of the pulsed laser dot effect of the raster scan. These artifacts can be designed to lend the symbol 98 shading effects or a three dimensional look.

Figure 11:
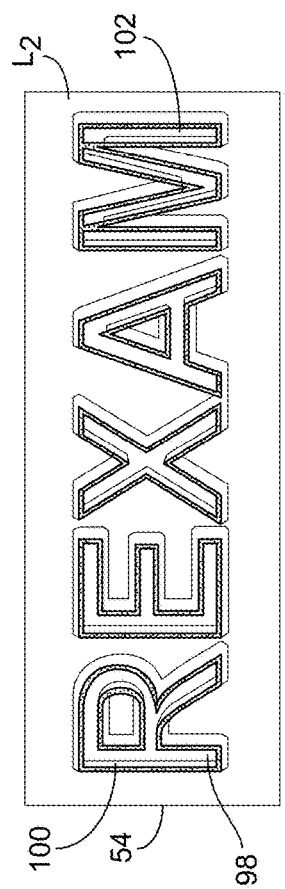
FIG. 11 is a magnified partial top view of a grab portion of a tab decorated according to one aspect of the present invention, using a laser to produce shading by producing a step-wise or gradient-wise reduction in a layer of a coating to produce a symbol having three dimensional effects.
Figure 13:
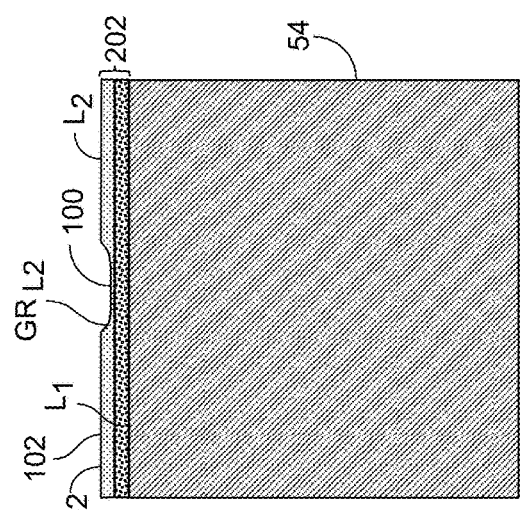
FIG. 13 is a schematic representation of a cross-section of a portion of FIG. 11 showing a laser removal of a layer of a coating to produce gradient-wise shading to create the symbol illustrated in FIG. 11.
Figure 12:
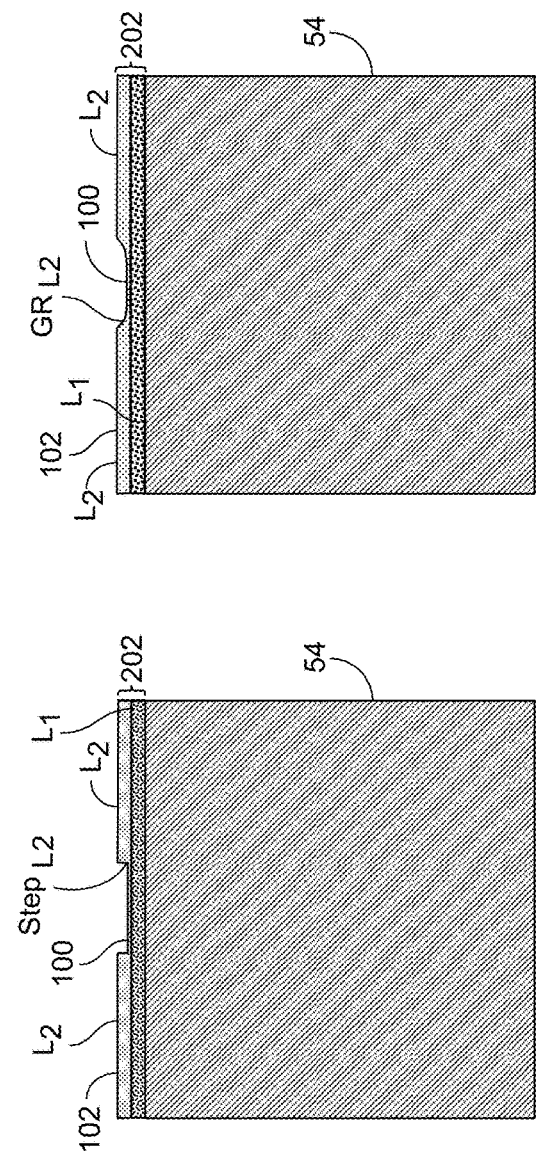
FIG. 12 is a schematic representation of a cross-section of a portion of FIG. 11 showing a laser removal of a layer of a coating to produce step-wise shading to create the symbol illustrated in FIG. 11.

In one embodiment illustrated in FIGS. 11-13, three dimensional effects are generated through use of a vector scan. Here, an incremental decrease in a thickness of a top layer $L_2$ relative to an overall thickness of the coating allows shading as a color of a lower layer $L_1$ becomes visible. This can be created by a shading step $Step_{L2}$ or a shading gradient $GR_{L2}$ of the second layer $L_2$ is created by not fully ablating the second layer $L_2$ through to the first layer $L_1$. The step $Step_{L2}$ or the gradient $GR_{L2}$ will have a slightly different shade than the surrounding portions of the tab and symbol 98 to create the three dimensional effect. The step or gradient may be formed by a raster scan, but is preferably formed by an additional vector scan. In this way, the tab 26 undergoes a plurality of vector scans to produce a plurality of boundary profiles 100 of a continuous, uninterrupted dot pattern 318 wherein each vector scan produces ablation of a different depth to create three dimensional and other effects.

Additionally, by ablating through most of the top color layer $L_2$ but leaving enough of the top layer $L_2$ to create color dots, a shaded color somewhere between the color of the top layer $L_2$ and the lower layer $L_1$ on the color spectrum can be produced. For example, one could ablate through a black color layer to produce a darker version of a lower layer of a red pigment. The black dots are so small that your eye would blend the black dots with the under coat color to produce various shades of color. So you could have multiple shades of red by leaving varying amounts of black dots. So they could make a shadow, or a 3 D image by varying the shading (i.e. differing how they leave the black dots).

In another embodiment illustrated in FIGS. 14-16, three dimensional effects are again generated through use of a vector scan. Here, a shading step $Step_{L2}$ or a shading gradient $GR_{L2}$ of the second layer $L_2$ is also created by not fully ablating the second layer $L_2$ through to the first layer $L_1$. Like the previous example, the step $Step_{L2}$ or the gradient $GR_{L2}$ will have a slightly different shade than the surrounding portions of the tab and symbol 98 to create the three dimensional effect. Here, however, a further effect is created by further ablation through the second layer $L_2$ to fully reveal the color of the first layer $L_1$ (or a metallic color of the can end 10 in the case where the first layer $L1$ is a clear coat). This further ablation is generally created by a subsequent vector scan outlining a further boundary profile 100 of a continuous, uninterrupted dot pattern 318 of the symbol 98, as described above. A raster scan may be subsequently performed to create a fill area 102 if and when the dwell time permits.

Figure 17:
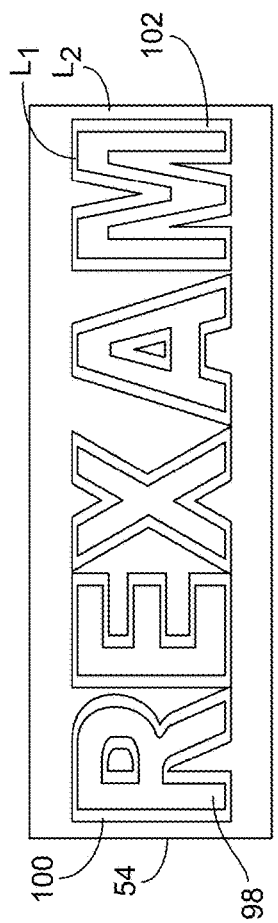
FIG. 17 is a magnified partial top view of a grab portion of a tab decorated according to one aspect of the present invention, using a laser to produce shading by producing a step-wise or gradient-wise reduction of a plurality of layers of a coating to produce a symbol having three dimensional effects.
Figure 18:
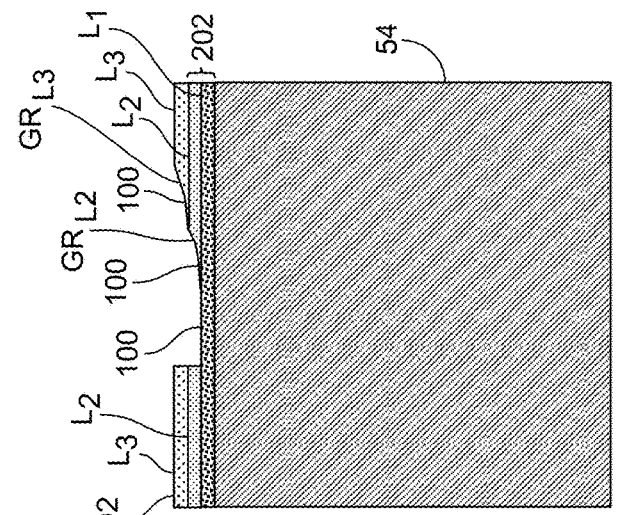
FIG. 18 is a schematic representation of a cross-section of a portion of FIG. 17 showing a laser removal of a plurality of layers of a coating to produce step-wise shading to create the symbol illustrated in FIG. 17.
Figure 19:
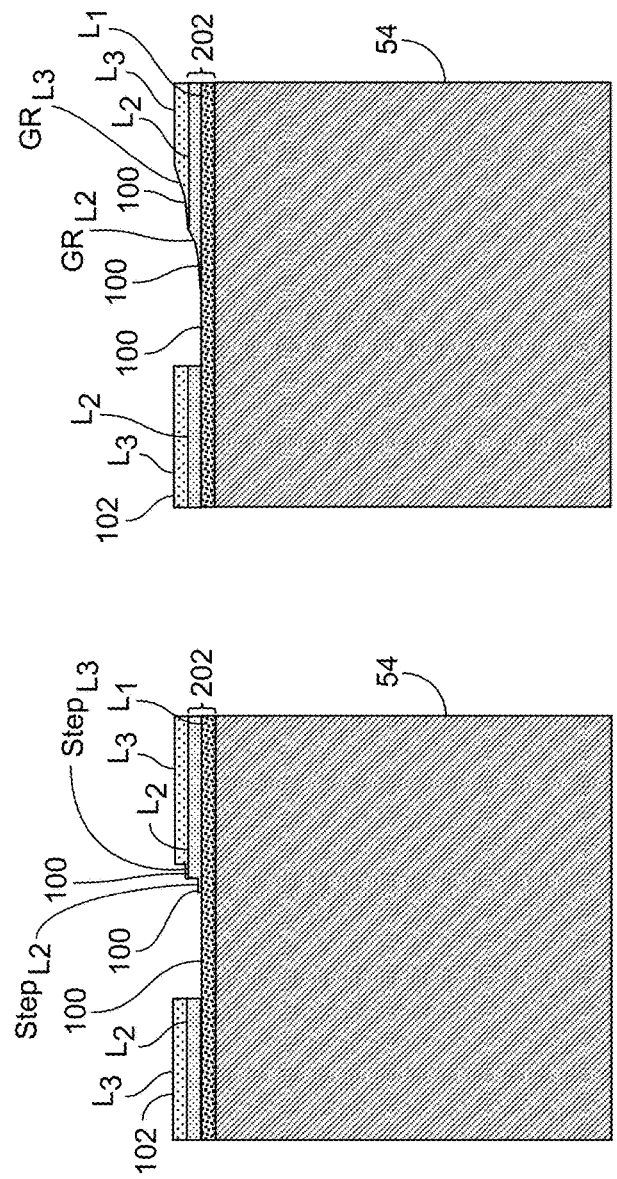
FIG. 19 is a schematic representation of a cross-section of a portion of FIG. 17 showing a laser removal of a plurality of layers of a coating to produce gradient-wise shading to create the symbol illustrated in FIG. 17.

In another embodiment illustrated in FIGS. 17-19, three dimensional effects are again generated through use of a vector scan in combination with a raster scan. Here, a shading step $Step_{L3}$ or a shading gradient $GR_{L3}$ of a third layer $L_3$ is created by not fully ablating the third layer $L_3$ through to the second layer $L_2$. A second shading step $Step_{L2}$ or gradient $GR_{L2}$ is created by not fully ablating the second layer $L_2$ through to the first layer $L_1$. Similar to the previous examples, the steps or the gradients will have slightly different shades than the surrounding portions of the tab and symbol 98. This creates the three dimensional effect with multiple shades using only two color-carrying layers $L_2$ and $L_3$. In other words, the number of colors exhibited by the symbol 98 can exceed the number of colors in the layers $L_2$, $L_3$ used to create the symbol 98. Here too, a further effect can be created by further ablation through the second layer $L_2$ to fully reveal the color of the first layer $L_1$ (or a metallic color of the can end 10 in the case where the first layer $L_1$ is a clear coat). These further ablations are generally created by a subsequent vector scan or scans outlining a further boundary profile 100 of a continuous, uninterrupted dot pattern 318 of the symbol 98, as described above. A raster scan may be subsequently performed to create a fill area 102 if and when the dwell time permits.

Figure 20:
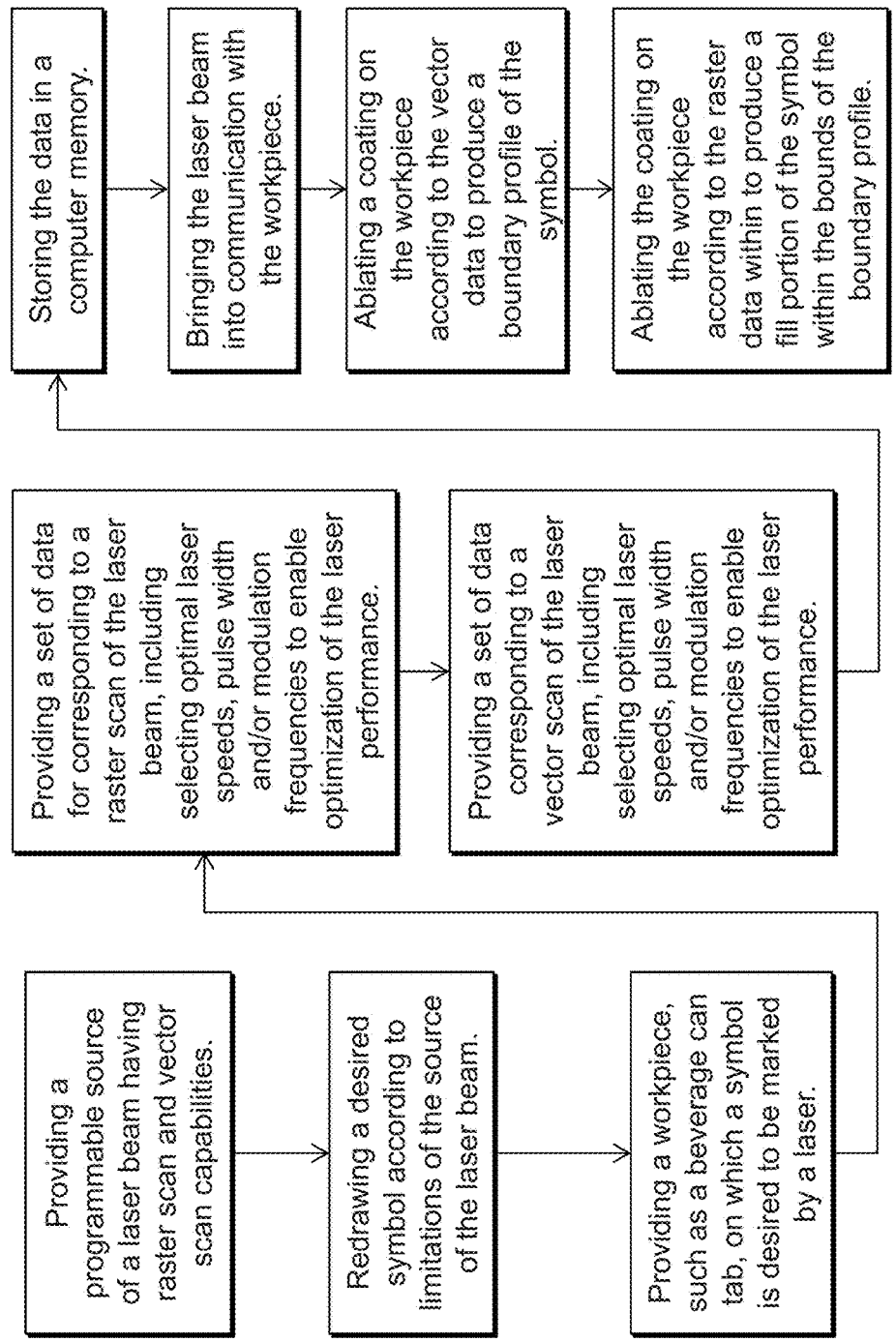
FIG. 20 is a flowchart of a method of the present invention.

Referring generally to FIG. 20 in conjunction with FIGS. 1-19 and the description set forth above, the invention also includes methods and improvements for decorating a beverage can tab. Initially, a laser marking apparatus such as the one discussed in relation to FIG. 3 is provided. The preferred apparatus has laser beam vector scan and raster scan capabilities. The apparatus is programmable. Accordingly, it has a memory for storing software modules used to control the movement of the galvanometers and consequently the laser beam across a workpiece. The apparatus may include software modules for inputting and/or receiving raster and/or vector data for producing or generating movement of the laser beam to produce desire symbols. The apparatus also includes controls for varying parameters of the laser beam, such as power, dot size or dot area, laser speed, pulse width, pulse frequency, and/or modulation frequencies. This enables optimization of laser performance which enhances resolution the magnitude and character of these parameters can be associated with the raster and vector data and stored in the memory and programmably varied according to desired results. The preferred apparatus is a $CO_2$ laser, e.g. produced by Videojet Technologies Inc. However, the invention described herein may also be practiced using YAG-type and/or fiber laser systems.

Typically, symbols are provided to can manufacturers in jpeg, pdf, or other image files without regard to scaling of the symbol to fit on a grab portion of the tab. This data can be easily translated to raster data using a scanner or a software module. However, this type of data translation is performed with little or no regard to the capabilities of the laser apparatus. Therefore, it is an improvement to redraw the desired symbol according to performance characteristics or limitations of the specific laser apparatus or the source of the laser beam. These limitations include laser beam, such as power, dot size or dot area, laser speed, pulse width, and/or modulation frequencies. In some cases, redrawing the symbol may include generating a drawing or image for producing raster data (fill data) and generating a second drawing or image for generating vector data (boundary profile data).

According to at least one method of the invention, a set of data corresponding to a raster scan of the laser beam is generated. This raster scan data may be automatically generated from a scanned image by a software module stored in the memory of the apparatus. Alternatively, the data can be manually developed and stored. The raster data is provided for use in traversing the laser beam in a raster scan to ablate a coating on the workpiece to produce fill or interior ablation of the symbol.

According to at least one method of the invention, a set of data corresponding to a vector scan of the laser beam is generated. This vector scan data may be automatically translated from raster data or a scanned image by a software module stored in the memory of the apparatus. Alternatively, the data can be manually developed and stored. The vector data is provided for use in traversing the laser beam in a vector scan to ablate a coating on the workpiece to produce the boundary profile or boundary profiles of a symbol.

A workpiece, i.e. a beverage can tab, on which a symbol is desired to be marked by a laser is provided. The laser beam is brought into communication with the workpiece, and a coating on the workpiece is ablated according to the vector data to produce a boundary profile or boundary profiles of the symbol as previously described. The workpiece is subjected to subsequent further ablation according to the raster data to produce the fill portion of the symbol within the bounds of the boundary profile or profiles as previously described.

In another embodiment, a method for decorating a tab for a beverage container includes the steps of providing a source of a laser beam; providing a tab stock of an aluminum alloy coated with a first layer of an opaque colored epoxy; generating a laser beam; providing a vector data set corresponding to an outline of a predetermined symbol; providing a raster data set corresponding to an interior region of the predetermined symbol; directing the laser beam at the tab stock according to the vector data set to remove portions of the first layer to produce the outline of the predetermined symbol on the tab stock; and directing the laser beam at the tab stock according to the raster data set to remove portions of the first layer to produce the interior of the predetermined symbol on the tab stock. The resultant tab has a vertorized boundary profile of the continuous, uninterrupted vectorized laser dot pattern and a rasterized interior fill portion of a plurality of pulsed laser dots. Tab decorations according to this method can be produced within the industry dwell times defined above.

In another embodiment, a method of decorating a beverage can end tab comprises the steps of: providing a source of a laser beam; generating a laser beam from the source; focusing the laser beam an object distance from the source; creating an ablation cycle for ablating a surface of the tab to form a symbol; adjusting a size of the laser beam as measured at the object distance; and varying the size of the laser beam during the ablation cycle.

In another embodiment, a method for decorating a tab for a beverage container wherein the tab comprises a lift end separated from a nose end by a central webbing comprises the steps of providing a source of a laser beam; generating a laser beam from the source; focusing the laser beam an object distance from the source; creating an ablation cycle for ablating a surface of the tab to form a symbol; and creating a non-linear laser beam path during the ablation cycle.

Referring specifically to FIGS. 21-29, a symbol having a holographic nature or a holographic symbol can be generated. Again, the limiting factor in generating such a symbol is the dwell time available to create the symbol. Most holographic images cannot be created within a dwell time of 100 milliseconds or less. However, using the principles of the invention described above and the additional principles described hereinafter, symbols having holographic aspects can be created within the dwell times defined herein.

Figure 21:
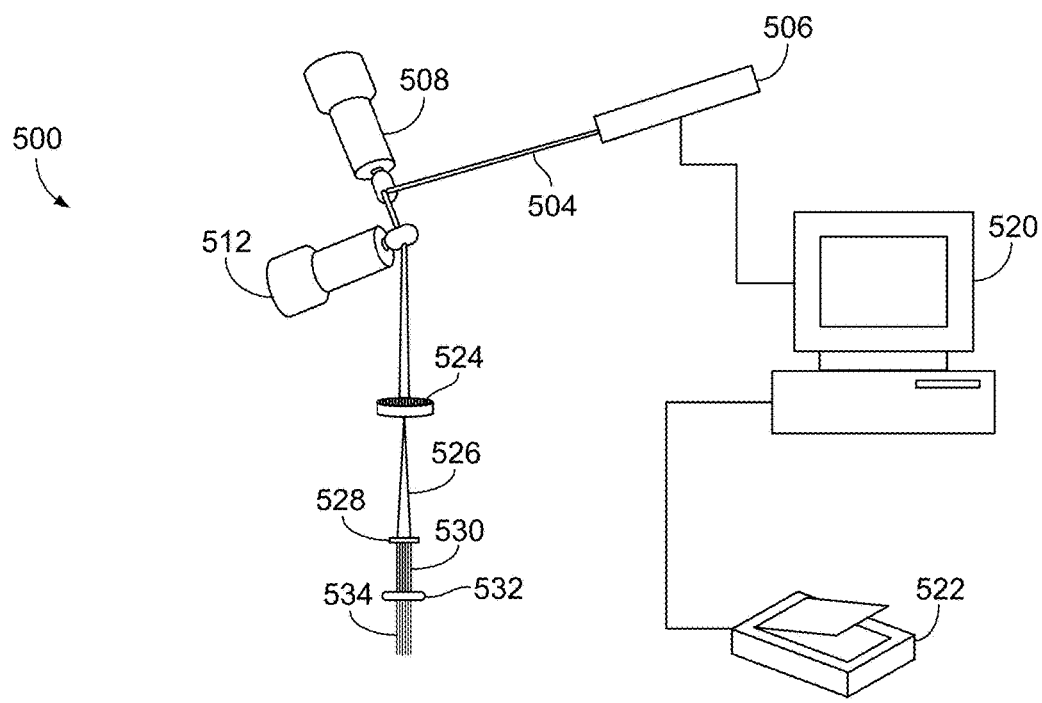
FIG. 21 is a schematic representation of a method and apparatus for decorating a tab of an embodiment of the invention.

A method and apparatus 500 for generating a symbol comprising a light diffraction grating or pattern feature created by ablation patterns of a plurality extremely narrow slits in the coating 202 is illustrated in FIG. 21. Using this technique, symbols having a light diffraction feature can be formed, including holographic features. The light diffraction feature can form all or only part of the symbol, and the light diffraction feature can be located on any portion of the tab.

By scanning a laser beam 504 outputted from a source 506 with a movable X-axis galvanometer (mirror) 508 and a movable Y-axis galvanometer 512 (also a mirror), through a filter 524, such as a polarizing filter, such that a secondary laser beam 526 is output from the filter 524 to a mask 528, wherein the secondary laser beam 526 is masked or shielded according to the desired symbol to be created, and a tertiary beam 530 comprising a plurality of micro beams is output from the mask 528 and refocused by a lens 532 such that a highly focused, high-energy quaternary beam 534 comprising a plurality of high-energy micro beams is output from the lens 532 to ablate slit patterns in the tab coating 202 according to the invention herein described. Again, hardware, such as a computer 520 and/or scanner 522 can be used to control the source of the laser beam 506. The movement of the laser beam 504 across the mask 528 is controlled by movement of the mirrors 508, 512 which are controlled by a controller, generally the computer.

The mask 528 can be formed from materials such as a dielectric. The mask 528 can have a laser ablation mask pattern from multiple dielectric layers. The multiple dielectric layers can have alternating high and low indices of refraction that, when overlaid, result in opaque mask areas that exhibits maximum reflectivity of laser energy.

Figure 22:
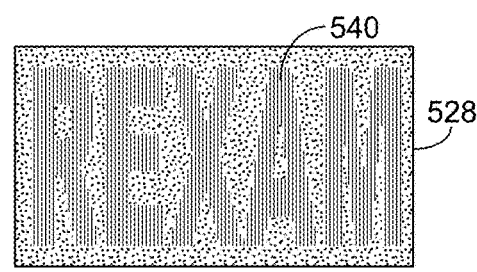
FIG. 22 is a top view of a mask or template for forming a decorated tab of the present invention.

The mask 528 includes a pattern corresponding to an overall shape of a desired holographic symbol, such as the word "REXAM" in the example illustrated in FIG. 22. The pattern comprises a micros slit pattern which includes one or more micro slits 540 which allow the laser light from the secondary beam 526 to pass through establishing the tertiary beam 530. A width, depth, and spacing of the micro slits are adjusted according to a desired outcome.

Figure 23:
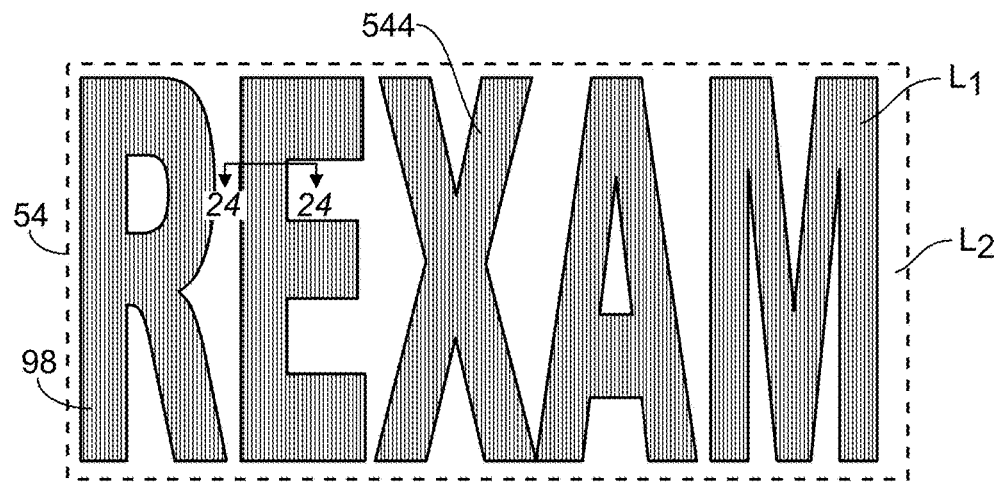
FIG. 23 is a magnified partial top view of a grab portion of a tab decorated according to one aspect of the present invention, using a laser to provide a plurality of ablated slits in a predetermined pattern associated with the mask to produce a symbol producing a diffraction pattern, including but not limited to a holographic image on the grab portion.
Figure 24:
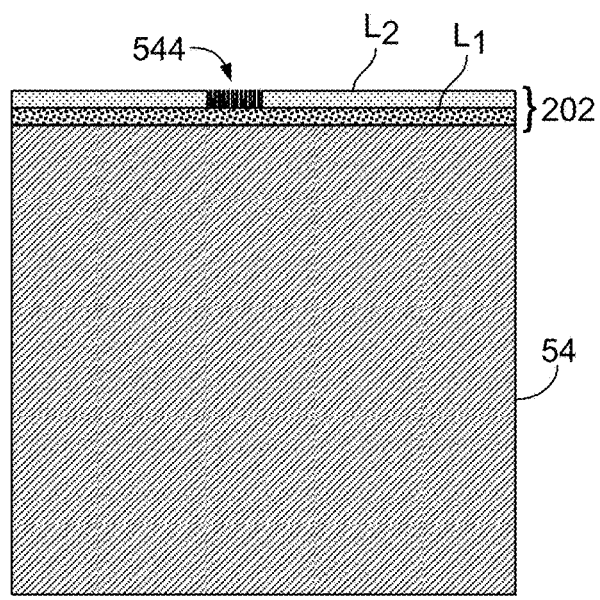
FIG. 24 is a schematic representation of a cross-section of a portion of FIG. 23 showing a laser removal of a coating to produce a plurality of micro slits of varying depth and widths to produce a diffraction pattern symbol.

The lens 530 receives the tertiary beam 530 and refocuses the beam 530 into the quaternary beam 534. The quaternary beam 534 comprises a plurality of high-energy micro beams which, when directed against the grab portion of the tab, ablates portions of the coating 202 in a micro slit pattern including one or more extremely narrow slits 544 having a width narrower than the wavelength of light as shown in FIG. 23. The micro slit pattern is generally imperceptible or very nearly imperceptible to the naked human eye. Overall, the slits 544 are arranged in the desired pattern of the symbol, and may have differing depths and widths depending on the desired visual outcome, but at least some of the slits 544 pass through an outer opaque layer $L_1$ to reveal a clear coat layer $L_2$ as shown in FIG. 24. At least some of the slits 544 have a slit width less than 1000 nm, preferably between 380 nm and 750 nm, or any range or combination of ranges therein. The depth of the slits 544 is generally on the order of less than 1000 nm, more preferable less than 800 nm, and most preferably on the order of about 167 nm, or any range or combination of ranges therein The resulting symbol has a holographic appearance, i.e. it has depth that enhances a three dimensional look. This effect is created by the extremely narrow slits 544 which create a diffraction of ambient light caused by a light wavelength interfering with an incident light are preferable.

Figure 25:
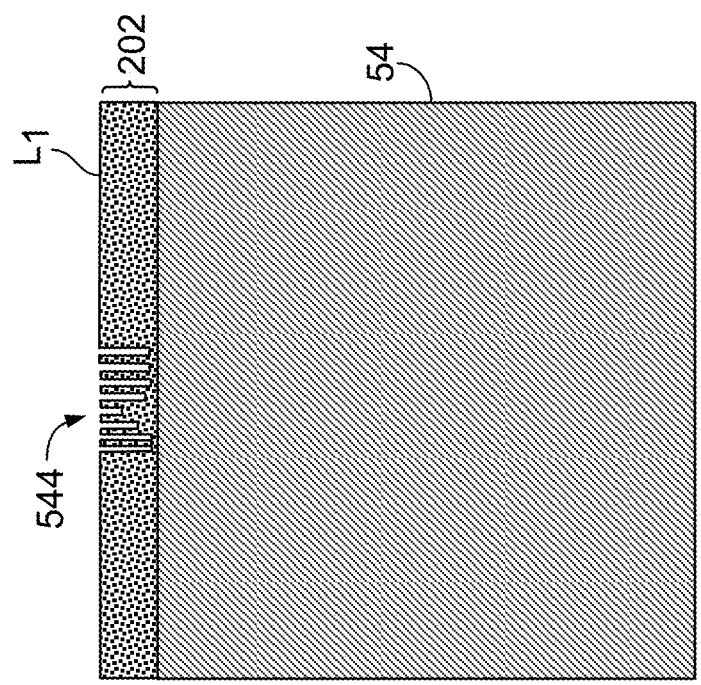
FIG. 25 is a schematic representation of a cross-section of a portion of a tab showing a laser removal of a coating to produce a plurality of micro slits of varying depth and widths to produce a diffraction pattern symbol.
Figure 30C:
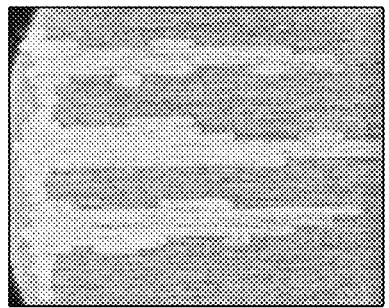
FIGS. 30A-30D are examples of laser ablated symbols on commercially available beverage can tabs.
Figure 30B:
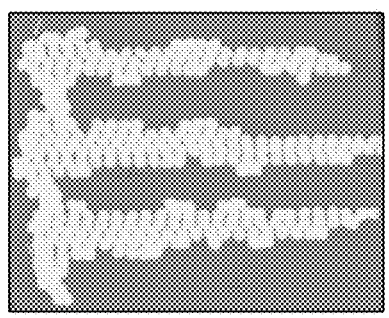
Figure 30A:
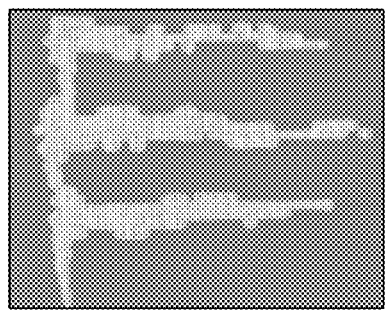

According to the embodiment illustrated in FIG. 25, a coating 202 having a single layer $L_1$ of a translucent material has a plurality of slits 544 ablated therein. The slits 544 have a depth allowing for a desired diffraction pattern and preferably having a depth less than 1000 nm, more preferable less than 800 nm, and most preferably on the order of about 167 nm, or any range or combination of ranges therein. Of course, the depths from slit to slit can be varied, and the depth with an individual slit can be varied to arrive at a desirable diffraction pattern.

Figure 26:
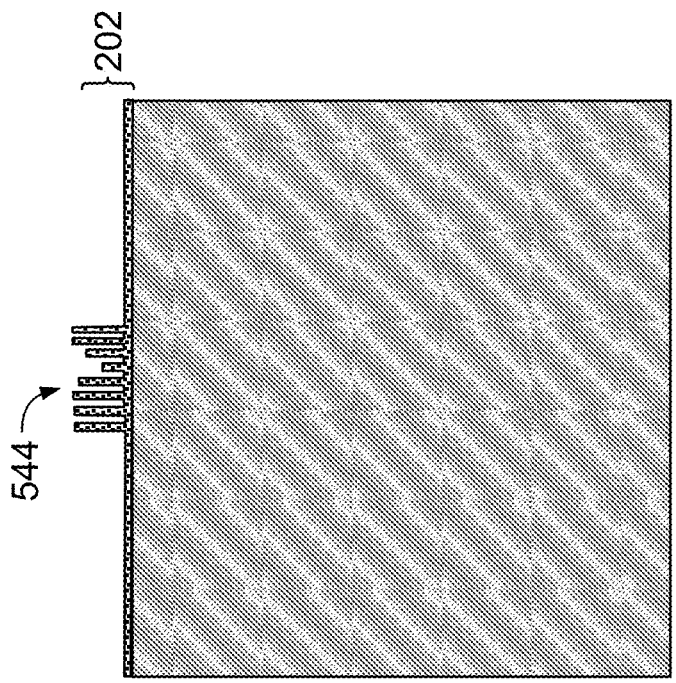
FIG. 26 is a schematic representation of a cross-section of a portion of a tab showing a laser removal of a coating to produce a plurality of micro slits of varying depth and widths to produce a diffraction pattern symbol.

According to the embodiment illustrated in FIG. 26, a coating 202 having a single layer $L_1$ of a translucent material has a plurality of slits 544 formed therein. The slits of this embodiment are surrounded by further ablated portions of the coating 202 such that the slits appear above remaining portions of the coating 202. The slits 544 have a depth allowing for a desired diffraction pattern and preferably having a depth less than 1000 nm, more preferable less than 800 nm, and most preferably on the order of about 167 nm, or any range or combination of ranges therein. Of course, the depths from slit to slit can be varied, and the depth with an individual slit can be varied to arrive at a desirable diffraction pattern.

According to the embodiment illustrated in FIGS. 27 and 28, a symbol 98 is formed using the vector technique described above to form a symbol boundary 100 of ablated coating, preferably a clear coat layer $L_1$. A fill portion 102 of the symbol 98 is formed having diffraction feature as described above. Accordingly, a micro slit pattern as described above is generated within the boundary 100 of the symbol 98. The resulting symbol appears as a rainbow of color caused by light diffraction while the micro slit pattern is imperceptible or nearly imperceptible to the naked human eye.

According to the embodiment illustrated in FIG. 29, a coating 202 may be embossed with a pattern of micro slits having depths and widths as described above to arrive at desirable diffraction pattern, including a holographic image. In this embodiment, the coating may comprise a first layer $L_1$ of a clear coat, a second layer $L_2$ of a highly reflective material, such as a film, metallic film, or metallicized polymeric film, and a third layer $L_3$ of an outer clear coat. The basic structure is similar to the laser treated examples in that the outermost clear coat layer $L_3$ is embossed with a slit pattern. The highly reflective layer $L_2$ may also be embossed to arrive at a holographic image symbol.

FIGS. 30A-D are photographs of laser ablated beverage can tab of commercially available beverage cans. The tabs have a trademark symbol of the MONSTER® brand energy drink. It is believed the symbols were created during the industry standard dwell time no greater than 100 milliseconds, and most likely less than 50 milliseconds. Each symbol in FIGS. 30A-D includes the pixilation, poor resolution, and artifacts of coating discussed earlier.

Figure 31:
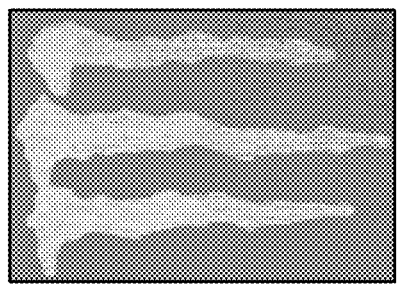
FIG. 31 is an example of a laser ablated symbol on a beverage can tab produced according to the teachings of the present invention and within a desired dwell time of less than 50 milliseconds.
Figure 30D:
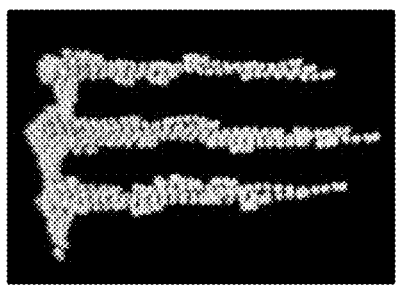

FIG. 31 is a photograph of a laser ablated beverage can tab produced according to the teachings of the present invention. The symbol was create in less than 50 milliseconds. Clearly, the symbol on the tab of FIG. 31 is a dramatic improvement over the commercially available tabs. The symbol of FIG. 31 has reduced pixilation, improved resolution (note the clear separation between components of the symbol and the smooth boundary profile), and much fewer artifacts in the fill areas of the symbol.

The terms "first," "second," "upper," "lower," "top," "bottom," etc. are used for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings. The term "coating" is intended to broadly include a plurality of layers of color-carrying and non-color-carrying, opaque and translucent material, typically layers of epoxy, paint, oxide, film, metallic film, etc. Micro slit width is defined as a distance across an opening in the slit. Micro slit depth is measured as a distance from a lowermost point in a particular location of a slit taken 90 degrees to a line drawn along the width of the slit in the same location.

While the specific embodiments have been illustrated and described, numerous modifications come to mind without significantly departing from the spirit of the invention and the scope of protection is only limited by the scope of the accompanying Claims.

What is claimed is:

1. A decorated tab for a beverage container comprising:
   a lift end;
   a nose end for contacting a tear panel on a beverage can lid opposite the lift end;
   a central webbing between the lift end and the nose end, the central webbing comprising a plurality of layers;
   a first layer on the central webbing of a coating;
   a second layer of a reflective metal wherein the first layer is deposited on the second layer; and
   a symbol on the central webbing comprising a light diffraction feature produced from a micro slit pattern in the coating directly above with the reflective metal.

2. The decorated tab of claim 1 wherein the micro slit pattern comprises a slit in the coating having a width less than 1000 nm.

3. The decorated tab of claim 1 wherein the micro slit pattern comprises a slit in the coating having a depth less than 1000 nm.

4. The decorated tab of claim 1 wherein the micro slit pattern comprises a plurality of slits formed in the coating having a depth less than 1000 nm.

5. The decorated tab of claim 1 wherein the light diffraction feature is created by selective removal of the coating by a laser ablation.

6. The decorated tab of claim 1 wherein the light diffraction feature is created by embossing the coating to produce the micro slit pattern.

7. The decorated tab of claim 1 wherein the symbol is created in under 50 milliseconds.

8. The decorated tab of claim 1 wherein the central webbing comprises an enclosed region and wherein the light diffraction feature is formed thereon.

9. A decorated tab for a beverage container comprising:
   a lift end;
   a nose end for contacting a tear panel on a beverage can lid opposite the lift end;
   a central webbing between the lift end and the nose end;
   a coating deposited on a metallic tab stock of the central webbing; and
   a light diffraction feature formed on the central webbing formed from a micro slit pattern in the coating directly above the metallic tab stock of the central webbing.

10. The decorated tab of claim 9 further comprising:
    a symbol on an enclosed region of the central webbing wherein the symbol comprises the light diffraction feature.

11. The decorated tab of claim 10 wherein the symbol comprises:
    a first boundary profile defining a perimeter of the symbol comprising regions of ablated coating outlining the light diffraction feature; and
    an interior portion comprising the light diffraction feature.

* * * * *